United States Patent [19]
Schubert et al.

[11] Patent Number: 5,110,436
[45] Date of Patent: May 5, 1992

[54] WATER ELECTROLYSIS

[75] Inventors: Franz H. Schubert, Chardon; David J. Grigger, Mayfield Heights, both of Ohio

[73] Assignee: The United States of America as represented by the Adminstrator of the National Aeronautics and Space Administration, Washington, D.C.

[21] Appl. No.: 648,933

[22] Filed: Feb. 1, 1991

[51] Int. Cl.⁵ .......................... C25B 1/04; C25B 1/12
[52] U.S. Cl. .................................................... 204/129
[58] Field of Search .......................... 204/129, 278, 284

[56] References Cited

U.S. PATENT DOCUMENTS

| | | | |
|---|---|---|---|
| 3,711,385 | 1/1973 | Beer | 204/59 |
| 4,078,985 | 3/1978 | Takeuchi | 204/230 |
| 4,613,304 | 9/1986 | Meyer | 204/129 X |
| 4,781,803 | 11/1988 | Harris et al. | 204/129 |
| 4,793,910 | 12/1988 | Smotkin et al. | 204/268 |
| 4,797,185 | 1/1989 | Polak et al. | 204/129 |
| 5,037,518 | 8/1991 | Young et al. | 204/129 X |

*Primary Examiner*—Donald R. Valentine
*Attorney, Agent, or Firm*—Russell E. Schlorff; Guy M. Miller; Edward K. Fein

[57] ABSTRACT

This disclosure is directed to an electrolysis cell forming hydrogen and oxygen at spaced terminals. The anode terminal is porous and able to form oxygen within the cell and permit escape of the gaseous oxygen through the anode and out through a flow line in the presence of backpressure. Hydrogen is liberated in the cell at the opposing solid metal cathode which is permeable to hydrogen but not oxygen so that the migratory hydrogen formed in the cell is able to escape from the cell. The cell is maintained at an elevated pressure so that oxygen liberated by the cell is delivered at elevated pressure without pumping to raise the pressure of the oxygen.

6 Claims, 1 Drawing Sheet

U.S. Patent
May 5, 1992
5,110,436
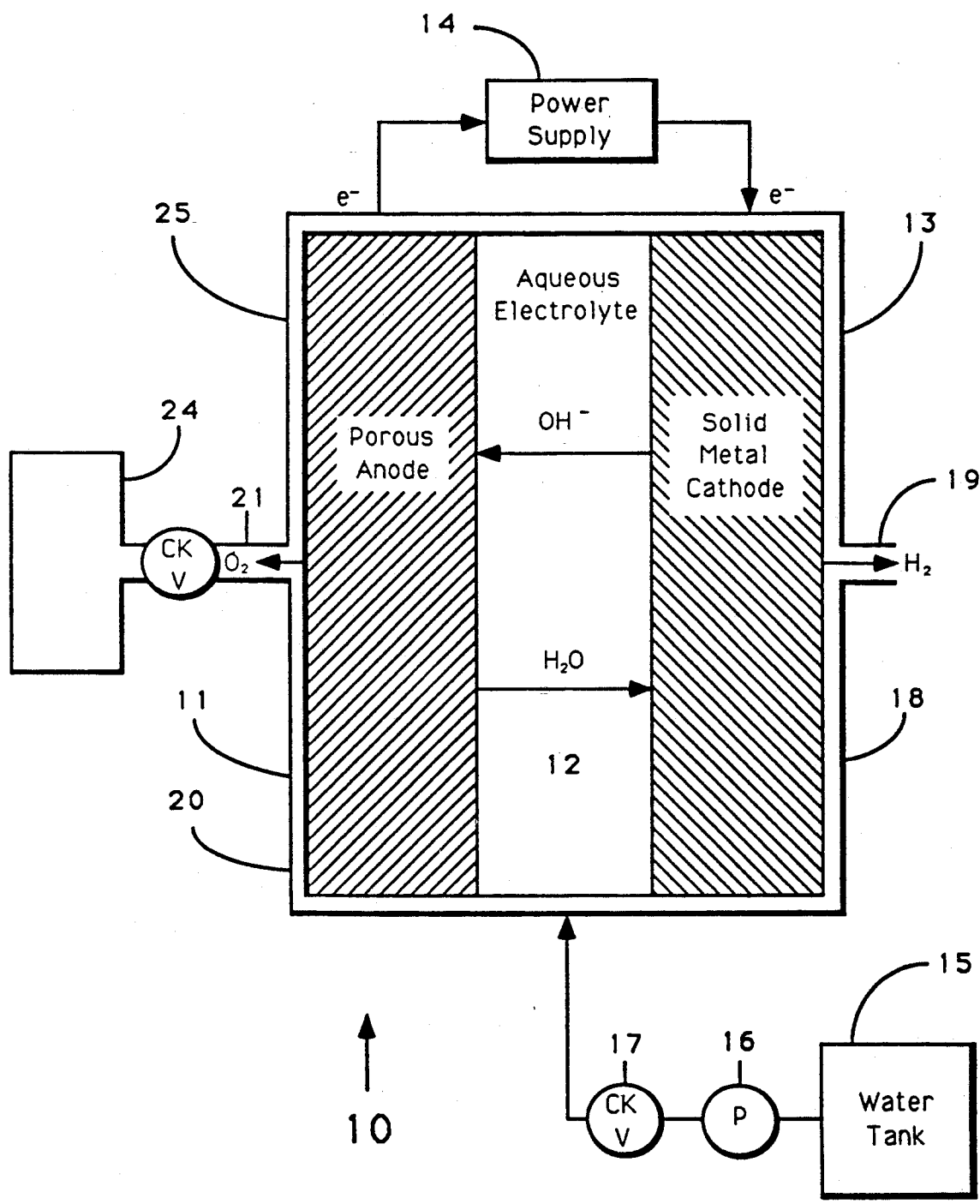

WATER ELECTROLYSIS

ORIGIN OF THE INVENTION

The invention described herein was made in the performance of work under a NASA contract, and is subject to the provisions of Public Law 96-517 (35 USC 202 et seq.) in which the Contractor has elected not to retain title.

BACKGROUND OF THE DISCLOSURE

The Deployment of a low-Earth-orbit Space Station and the onset of advanced missions will necessitate significant requirements of metabolic oxygen ($O_2$) for Extravehicular Activity (EVA). This $O_2$ must be supplied at high pressure (i.e., up to 41,368 kPa (6,000 psia)) to refill EVA $O_2$ bottles. Due to the weight, volume and logistic penalties associated with high pressure $O_2$ resupply and storage, alternative technologies which utilize on-board Space Station resources (i.e., electricity and water) such as water electrolysis systems are preferable. The Solid Metal Cathode (SMC) water electrolysis concept offers the capability to generate high pressure $O_2$ directly, thus minimizing system complexity and eliminating the need for a separate mechanical compressor. The key problem involved in this effort included the development of a water electrolysis concept which would be capable of safely and reliably generating high pressure $O_2$. The prior technique utilized for recharging the EVA $O_2$ bottles consists of supplying expendable $O_2$ bottles with each mission. Upon completion of the mission, the $O_2$ bottles are recovered and recharged. The primary limitation of the prior technique is that the weight, volume and logistic penalties associated with high pressure $O_2$ transportation and storage become prohibitive for long-term missions. Since these missions will be feature extensive EVA, it is essential that an alternative method be utilized. In this context, the present disclosure is directed to an airborne oxygen generator system and more particularly to one which incorporates a mechanism capable of forming oxygen in a space station in circumstances where gravity forces are either small or negligible. It forms oxygen as a gas by the electrolysis of water thereby liberating oxygen and hydrogen. The hydrogen is liberated in such a fashion that it does not pose a problem. Moreover, the oxygen generated by the system can be delivered against very high back pressures, with sufficient high pressure that oxygen generation provides its own substantial pressure drive to thereby simplify the system and avoid the necessity of a separate oxygen compressor or similar equipment, reducing the weight and complexity of the equipment.

The present disclosure sets out a system wherein a pair of spaced, preferably cylindrical or planar electrodes define an electrolysis cell. The two electrodes are separated by a space that is filled with water, and a suitable strong base placed in the water defines the necessary electrolyte. The water can be continuously consumed. The space between the electrodes may also be filled by a porous nonconductive media in which the water and suitably strong base are held by capillary forces. As water is converted into constituent gases, the water is replaced to keep the chamber filled. Moreover, the constituent gases are liberated at the spaced electrodes. One of the electrodes is porous while the other is a solid metal member. The solid metal electrode or terminal defines a pressure barrier so that one side can be maintained at a reduced or reference pressure while the other side is maintained at an elevated pressure. The elevated pressure enables delivery of the pressurized liberated oxygen to a pressure storage vessel without interposing a mechanical pump or compressor. Conveniently, the system is illustrated with a water supply and check valve to assure delivery of the necessary amount of water, and the gas which is liberated is delivered through a check valve into a storage container. Pressure regulators can be used to regulate the various segments when the equipment is not in use.

Known references include U.S. Pat. No. 3,711,385 which shows an electrode composed of palladium in an electrolytic cell.

U.S. Pat. No. 4,078,985 shows a hydrogen generator which is accomplished through the electrolysis of water. The apparatus consists of palladium or palladium alloys for the cathode material. A pipe is provided for the transmission of oxygen to the anode for collection. The object of this process is to produce a thin membrane cathode which prevents oxidation of the palladium and reduces electrical consumption.

U.S. Pat. No. 4,781,803 shows an electrolytic cell with a palladium cathode. The process is used for the disassociation of water into hydrogen and oxygen.

U.S. Pat. No. 4,793,910 shows an apparatus for the production of $H_2$ and $O_2$ by electrolysis. By making use of multiple membranes in parallel, the inventor claims to accomplish efficient photoelectrolysis. The membranes contain platinum.

U.S. Pat. No. 4,797,185 shows a fuel cell comprising a solid electrolyte to increase the mechanical strength of the apparatus. This cell appears to be the opposite process of the present disclosure.

By contrast, the present system sets forth a structure which is capable of attaining pressures as high as 6,000 psi across the cell. Moreover, this is accomplished so that the gas evolved has sufficient pressure drive of its own so that gas is delivered at an elevated pressure without a pump to overcome limitations on pressure in downstream delivery. In this context, the system is therefore a cell which both generates and pressurizes the oxygen which is necessary for operation of oxygen supported equipment or personnel aboard a space craft.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single drawing is a cell having spaced anode and cathode members with an electrolyte therebetween wherein water is supplied for the electrolyte, and hydrogen and oxygen are liberated by operation of the cell at a pressure capable of filling a large oxygen storage container.

DETAILED DESCRIPTION OF THE PREFERRED EMBODIMENT

Attention is directed to the only view of the drawings where the numeral 10 identifies the two electrodes and sandwiched electrolyte therebetween which make up the electrolysis cell of the present disclosure. The reaction in the cell will be described first and certain features of the surrounding and adjacent support structure will also be given so that the operation of the system can be more readily understood. Moreover, it will be described in the context of continuous operation so that water and electricity are supplied to the cell and oxygen and hydrogen gases are liberated. The process further contemplates the capture of the oxygen which is accumulated in a storage vessel at high pressures, pressures as high as 6,000 psi. This cell also incorporates a gas delivery system communicating from the cell to such a storage vessel.

The present apparatus is constructed of spaced terminals, one being a planar porous anode and the other being a tubular solid metal cathode. Physically, they are spaced evenly so that a chamber is defined therebetween to receive the electrolyte. The two terminals are either rectangular or circular. If circular, they can be enclosed within a common cylindrical housing and have been illustrated in this fashion. At one end of the housing, hydrogen gas is liberated. At the other end of the housing, oxygen gas is liberated. The disposition of the two gases will be described later. It is sufficient to note for purposes of the present description that a cylindrical housing encloses the two electrodes and the electrolyte therebetween and is provided with a pair of terminals for convenient connection to a DC power supply providing a DC voltage of sufficient measure and current flow of sufficient magnitude that the necessary amount of oxygen is generated.

Speaking in particular about the cell, the cell 10 incorporates a porous anode 11 and an electrolyte region 12 which is between the anode 11 and a solid metal cathode 13. The two terminals are connected with a power supply 14 which provides DC current through a pair of illustrated electrical connections. The current flow is directed through the illustrated terminals. Typically, the voltage of the power supply need only be in the range of one and one half to four volts. Typically, the current provided by the power supply must be sufficient to provide an appropriate current density. Current densities can run as high as about 50 amps/ft$^2$ or approximately 50 Ma/cm$^2$. Preferably, the cell 12 is filled with either potassium or sodium hydroxide in water solution, and the water is replenished during operation. To this end, the system incorporates a water tank 15 which is connected with a pump 16 which delivers water through a check valve 17 into the cell 12. The check valve assures that water does not leak out of the electrolytic cell. Thus, the pump is operated at a pressure sufficiently high to overcome any backpressure which is encountered during operation of the system.

In the preferred embodiment, the cathode 13 is a solid metal member which is primarily made of palladium. During operation, hydrogen is formed in the vicinity of the cathode 13 and it is initially deposited on the surface of the palladium cathode. It typically will have an ionic form which associates with palladium atoms of the solid cathode to thereby form a palladium-hydride transition complex. Structurally, the palladium is formed into the solid metal structure which, at the atomic level, defines a crystalline lattice. This therefore enables hydrogen ions to diffuse through the solid metal cathode 13 by progressive association from atom to atom within the lattice work so that hydrogen ions will diffuse across the thickness of the solid metal cathode 13. As individual ions migrate across, they are ultimately exposed on the remote surface of the cathode 13 and thereby combine to form H$_2$ for gaseous collection. In one important sense, the cathode serves as a solid metal. In this sense, the cathode serves as a solid metal barrier which is porous to the hydrogen ions but which is not permeable to hydrogen or oxygen molecules as will be described. The solid metal member therefore enables a pressure differential to be established across the cell. Thus, the hydrogen is collected as free hydrogen gas (H$_2$ in form) at the exposed face 18 and is conducted away through appropriate conduits 19 for storage or other disposition. It is recovered at a modest pressure level. That is, the hydrogen flow at 19 has only a modest pressure drive behind it. This pressure drive derives from the rate at which hydrogen is produced by the system, and that is generally a scale factor which depends on the surface area of the terminals in the cell 10 and the current density.

The solid metal cathode is primarily palladium. It can be formed as pure palladium, but the preferred form is to place it in an alloy with sufficient palladium content to assure permeability in the crystalline lattice for the migration of the hydrogen ions. To this end, it can be a relatively simple or complex alloy. Care should be taken that the alloy which makes up the cathode has the appropriate electrochemical activity relative to the anode for operation in the system.

The numeral 11 identifies the porous anode. It is porous or permeable to migration of oxygen molecules. They migrate through the anode 11. They are recovered at the opposite face 20. The oxygen is enclosed adjacent to that face and is conducted away from the anode by a conduit 21 through a check valve 22 and then to a storage container 24. The storage container is preferably operated at a pressure of about 6,000 psi. Obviously, it will fill multiple storage containers, and they can each be provided with pressure regulators or check valves. These have been omitted for sake of clarity of the present disclosure. An important factor, however, is that the oxygen in the container 24 may be stored at pressures as high as 6,000 psi. This requires therefore that the oxygen produced by the anode 11 must be raised to a pressure of about 6,000 psi or greater and which is sufficient to overcome and cause opening of the check valve 22 to fill the chamber or container 24. This requires that the cell 10 be enclosed in a pressurized housing 25. The housing must seal around the two terminals 11 and 13 to assure that the liberated dissimilar gases do not recombine after gas generation. Moreover, the housing must provide a hermetic seal capable of withstanding working pressures at 6,000 psi or greater. Accordingly, the pressure in the region of the anode 11 will be the back pressure which is reflected back into the system as a result of operation of the check valve 22 connected to the storage chamber pressure 24. Assuming this to be 6,000 psi, this requires the system to operate at 6,000 psi or more. Fortunately, the cathode 13 is a sufficiently large and thick membrane that this kind of pressure differential across the cathode poses no problem. Moreover, the high pressure acting on the aqueous electrolyte poses no problem to its operation. Accordingly, the pressure at the electrolyte side of the cathode 13 will be about 6,000 psi while the gradient of pressure across the cathode will drop so that it is just a few psi at the outlet line 19 where hydrogen is removed. As noted above, the cell 10 thus incorporates the surrounding housing which seals against both of the terminals 11 and 13 to assure that the produced gases from the two terminals are conveyed away and are delivered at the requisite pressures.

The cathode reactions are relatively straight forward. At the cathode, and on the electrolyte side, Equation 1 describes the reaction which occurs there. Equation 1 is:

$$4H_2O + 4Pd + 4e^- \rightarrow 4PdH + 4OH^- \tag{1}$$

The cathode reaction is completed which involves the migration of the hydrogen through the solid metal cathode 13 and hence, Equation 2 is accomplished particularly at the exposed face 18 of the cathode 13. Equation 2 is:

$$4PdH \rightarrow 4Pd + 2H_2 \uparrow \tag{2}$$

At the opposite terminal, the anode reaction is given by Equation 3. Equation 3 is:

$$4OH^- \rightarrow 2H_2O + O_2 \uparrow + 4e^- \tag{3}$$

Equation 3 involves the liberation of oxygen which is transferred through the anode 11 by the permeable flow of the oxygen to the far face.

As will be observed in the Equations 1 and 3, they are electrically balanced because the same number of electrons (the aggregated total charge) are required to drive Equations 1 and 3 as indicated. The present system has a relatively high current efficiency. The efficiency is in excess of ninety percent and can approach ninety-five or ninety-six percent. Efficiency is reduced primarily to the extent that individual hydrogen ions created at the cathode 13 may migrate back into solution and recombine in the cell. This causes some heating and reduction in efficiency. However, as a generalization, when the hydrogen ions enter the cathode 13 and begin migration across that solid member, then efficiency more aptly approaches the optimum of about ninety-six or ninety-seven percent. The current efficiency is thus dependent on a number of conditions including temperature of the system, current density, concentration of the alkaline solution in the cell, cathode composition, relative electrochemical activity of the cathode and anode to each other, the relative thickness of the cathode, back pressure in the hydrogen compartment, backpressure in the oxygen compartment, and other scale factors. It also depends on the propensity of bubbles to form in the cell. It is generally intended, however, that optimum efficiencies be obtained because the process does otherwise consume substantial quantities of electrical current to drive the conversion which is described.

As a matter of convenience, one version of the present system is constructed where the anode 11 and cathode 13 are circular having a diameter up to about two feet, and has a thickness of about one quarter inch to about three inches for each electrolyte cell. Both the anode and cathode are supported by the surrounding housing 25, at least structurally, but the housing 25 does not enter into the reaction involving gas generation. Multiple cells may be contained in the same housing.

While the foregoing is directed to the preferred embodiment, the scope thereof is determined by the claims which follow.

What is claimed is:

1. A method of generating elemental oxygen from an aqueous electrolyte cell wherein the method comprises:
   (a) forming an electrolysis cell charged with water in the cell wherein the cell has spaced and separated anode and cathode terminals;
   (b) flowing an electric current in the cell between the anode and cathode so that the current flow initiates dissociation of the water into elemental oxygen liberated at the anode thereof;
   (c) collecting the oxygen from the cell by delivery of the oxygen through a flow line extending from the anode of the cell;
   (d) operating the cell at an elevated pressure wherein the cathode is a solid member capable of withstanding the operating pressure imposed on the cell and further so that elemental hydrogen formed at the cathode is permeably transmitted across the cathode for removal from the cell; and wherein said cathode is positioned with an external face exposed for hydrogen gas collection in operation.

2. The method of claim 1 wherein the oxygen is formed in the cell and migrates across the anode to create a pressure drive for oxygen.

3. The method of claim 1 including the step of enclosing both the anode and cathode in a closed housing having open regions to collect liberated gases.

4. The method of claim 3 including the step of alloying palladium in the cathode to define a hydrogen migration pathway.

5. The method of claim 4 including the step of collecting hydrogen in a housing to deliver hydrogen through a flow line.

6. The method of claim 1 including the step of forming the oxygen at a porous anode and forming hydrogen at the cathode; and thereafter permeating oxygen across the anode for collection external of the cell.

* * * * *